(12) United States Patent
Wang

(10) Patent No.: US 9,791,008 B1
(45) Date of Patent: Oct. 17, 2017

(54) BRAKE DISC

(71) Applicant: Hsin-Fa Wang, Lukang Township, Changhua County (TW)

(72) Inventor: Hsin-Fa Wang, Lukang Township, Changhua County (TW)

( * ) Notice: Subject to any disclaimer, the term of this patent is extended or adjusted under 35 U.S.C. 154(b) by 0 days.

(21) Appl. No.: 15/212,577

(22) Filed: Jul. 18, 2016

(51) Int. Cl.
*F16D 65/78* (2006.01)
*F16D 65/12* (2006.01)
*F16D 65/847* (2006.01)

(52) U.S. Cl.
CPC ......... *F16D 65/128* (2013.01); *F16D 65/847* (2013.01); *F16D 2200/003* (2013.01); *F16D 2200/0008* (2013.01); *F16D 2250/0076* (2013.01)

(58) Field of Classification Search
CPC ...... F16D 65/12; F16D 65/123; F16D 65/127; F16D 65/128; F16D 65/847
USPC ................ 188/18 A, 218 A, 218 XL, 264 A, 188/264 AA
See application file for complete search history.

(56) References Cited

U.S. PATENT DOCUMENTS

| | | | | |
|---|---|---|---|---|
| 4,263,992 A * | 4/1981 | Moore | ................. | F16D 65/123 188/218 XL |
| 9,016,445 B2 * | 4/2015 | Hanna | ..................... | F16D 65/12 188/218 XL |
| 2003/0178265 A1 * | 9/2003 | Chen | ...................... | B62L 1/005 188/218 XL |
| 2005/0183909 A1 * | 8/2005 | Rau | ..................... | F16D 65/0006 188/218 XL |
| 2009/0260932 A1 * | 10/2009 | Hanna | ...................... | F16F 7/01 188/218 XL |
| 2013/0133997 A1 * | 5/2013 | Iwai | ......................... | B62L 1/00 188/218 XL |
| 2013/0186719 A1 * | 7/2013 | Yu | .......................... | F16D 65/12 188/218 XL |
| 2015/0144441 A1 * | 5/2015 | Kuo | ..................... | F16D 65/847 188/218 XL |

* cited by examiner

*Primary Examiner* — Christopher Schwartz
(74) *Attorney, Agent, or Firm* — Egberg Law Offices, PLLC

(57) ABSTRACT

A brake disk includes a first abrasive disk, a second abrasive disk and a heat dissipation disk co-axially sandwiched between the first abrasive disk and the second abrasive disk. A middle disk is co-axially mounted onto the first abrasive disk and the second abrasive disk, wherein the middle disk is adapted to be mounted to a hub. A specific heat capacity coefficient of the heat dissipation disk is greater than that of the first abrasive disk and the second abrasive disk for absorbing thermal energy from the first abrasive disk and the second abrasive disk and lowering the temperature of the first abrasive disk and the second abrasive disk during braking.

5 Claims, 13 Drawing Sheets

BRAKE DISC

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a brake disk, and more particularly to a brake disk that is high-abrasive and light, and has a good heat dissipation effect.

2. Description of Related Art Including Information Disclosed Under 37 CFR 1.97 and 37 CFR 1.98

Common braking devices are divided into two kinds including drum brakes and disc brakes. The two kinds of brake devices use brake lining to rub the drum or disc for causing friction to speed down or stop. Generally, the braking effect of the disc brake is better than that of the drum brake. As a result, a high grade bicycle or a bicycle having special safety concerns usually uses the disc brake for promoting the additional value of the bicycles.

As described above, the disc brake uses the brake lining to rub the disc for continual causing friction and uses the continually raised friction to speed down or stop, and the most kinetic energy is transformed to heat energy. As a result, the friction coefficient and the brake effect are reduced due to a high temperature of the brake lining and the disc. Consequently, two targets of a good brake disk are wear-resisting and heat dissipation. Moreover, a light brake disk is another target for a racing bicycle.

According to the three targets of the brake disk, some manufacturers provide many brake disks with high quality. However, these high quality brake disks are assembled due to complex metallurgy processes including melting, rolling, extrusion, cutting and sintering. As a result, these high quality brake disks, accordingly, have a high manufacturing cost.

The present invention has arisen to mitigate and/or obviate the disadvantages of the conventional brake disk.

BRIEF SUMMARY OF THE INVENTION

The main objective of the present invention is to provide an improved brake disk that is high-abrasive and light, and has a good heat dissipation effect.

To achieve the objective, the brake disk in accordance with the present invention comprises a first abrasive disk, a second abrasive disk 30 and a heat dissipation disk co-axially and securely sandwiched between the first abrasive disk and the second abrasive disk. A middle disk is co-axially mounted onto the first abrasive disk and the second abrasive disk, wherein the middle disk is adapted to be mounted to a hub. The heat dissipation disk, the first abrasive disk, the second abrasive disk and middle disk are metal products, wherein a specific heat capacity coefficient of the heat dissipation disk is greater than that of the first abrasive disk and the second abrasive disk for absorbing thermal energy from the first abrasive disk and the second abrasive disk and lowering the temperature of the first abrasive disk and the second abrasive disk during braking. The heat dissipation disk is made of aluminum or aluminum alloy, and the first abrasive disk and the second abrasive disk are made of iron. The first abrasive disk and the second abrasive disk are secured to the heat dissipation disk. The heat dissipation disk includes multiple through holes defined therein and the multiple through holes are annularly arranged. The first abrasive disk has multiple first raised portions formed thereon and a first annular rib peripherally formed thereon, wherein each first raised portion is received in a corresponding one of the multiple through holes. The second abrasive disk has multiple second raised portions formed thereon and a second annular rib peripherally formed thereon, wherein each second raised portion is received in a corresponding one of the multiple through holes and secured to a corresponding one of the multiple first raised portions. The first annular rib and the second annular rib are secured to each other and surround the heat dissipation disk.

Further benefits and advantages of the present invention will become apparent after a careful reading of the detailed description with appropriate reference to the accompanying drawings.

BRIEF DESCRIPTION OF THE SEVERAL VIEWS OF THE DRAWINGS

FIG. 2A is a partially enlarged view of the first disk in FIG. 2.

DETAILED DESCRIPTION OF THE INVENTION

Figure 1:
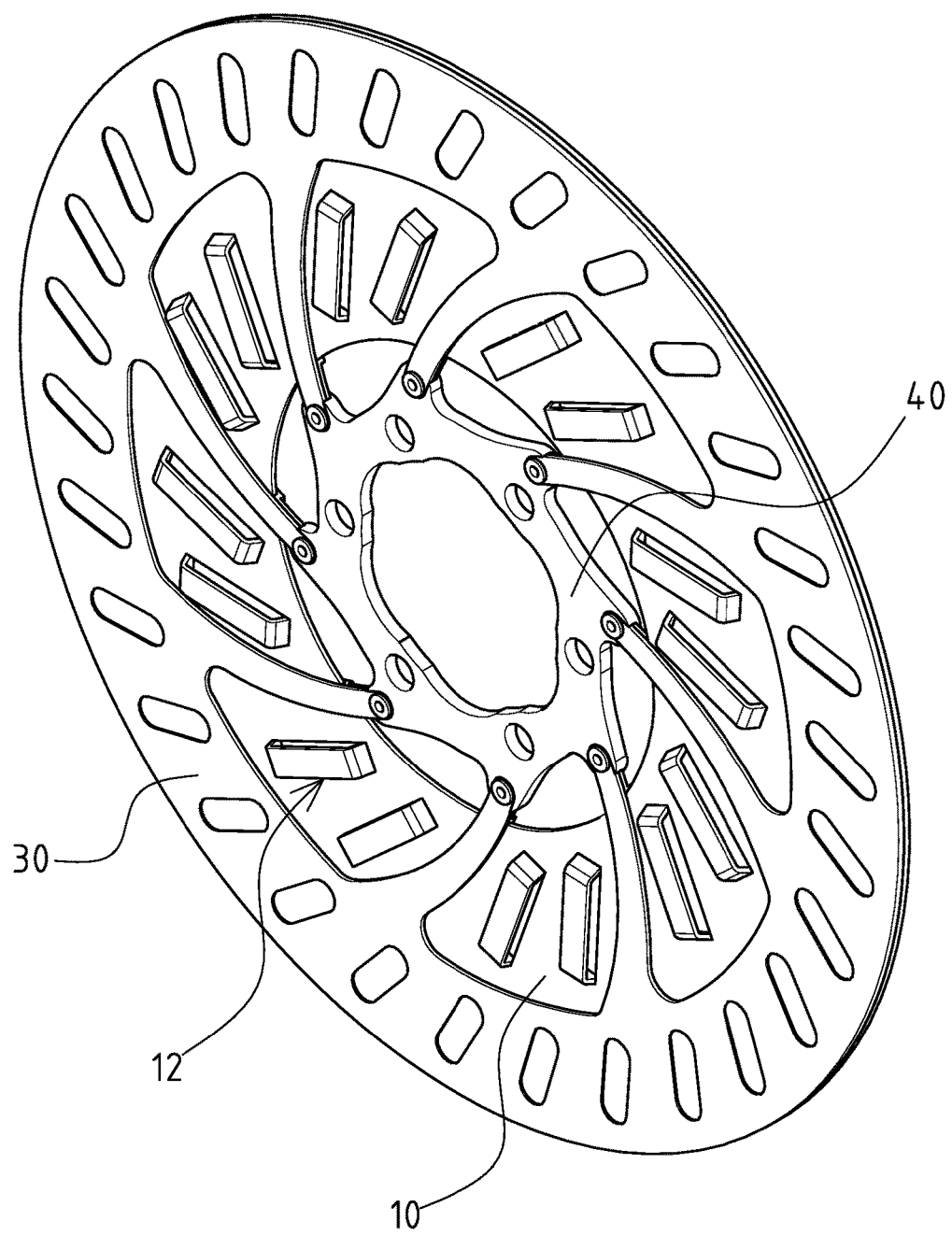
FIG. 1 is a perspective view of a brake disk in accordance with the present invention.

Referring to the drawings and initially to FIGS. 1-4, a brake disk in accordance with the present invention comprises a first abrasive disk 20, a second abrasive disk 30 and a heat dissipation disk 10 co-axially and securely sandwiched between the first abrasive disk 20 and the second abrasive disk 30. A middle disk 40 is co-axially mounted onto the first abrasive disk 20 and the second abrasive disk 30, wherein the middle disk 40 is adapted to be mounted to a hub (not shown). The heat dissipation disk 10, the first abrasive disk 20, the second abrasive disk 30 and middle disk 40 are metal products, wherein a specific heat capacity coefficient of the heat dissipation disk 10 is greater than that of the first abrasive disk 20 and the second abrasive disk 30 for absorbing thermal energy from the first abrasive disk 20 and the second abrasive disk 30 and lowering the temperature of the first abrasive disk 20 and the second abrasive disk 30 during braking. In the preferred embodiment of the present invention, the heat dissipation disk is made of aluminum or aluminum alloy, and the first abrasive disk 20 and the second abrasive disk 30 are made of iron. In addition, the first abrasive disk 20 and the second abrasive disk 30 are secured to the heat dissipation disk 10 by spot welding.

The heat dissipation disk 10 includes multiple through holes 11 defined therein and the multiple through holes 11 are annularly arranged. The heat dissipation disk 10 includes multiple heat dissipation structures 12 formed thereon and the heat dissipation structures 12 are annularly arranged in a diameter smaller than that of the annularly arranged through holes 11. Each heat dissipation structure 12 includes a slot 121 defined in the heat dissipation disk 10 and a bridge 122 having two opposite ends respectively connected to two opposite ends of a corresponding one of the slots 121. An opening 13 is centrally defined in the heat dissipation disk 10 for mounting the middle 40 to the first abrasive disk 20 and the second abrasive disk 30.

The first abrasive disk 20 has multiple first raised portions 21 formed thereon, wherein each first raised portion 21 is received in a corresponding one of the multiple through holes 11. The second abrasive disk 30 has multiple second raised portions 31 formed thereon, wherein each second raised portion 31 is received in a corresponding one of the multiple through holes 11 and secured to a corresponding one of the multiple first raised portions 21 by spot welding.

Figure 4:
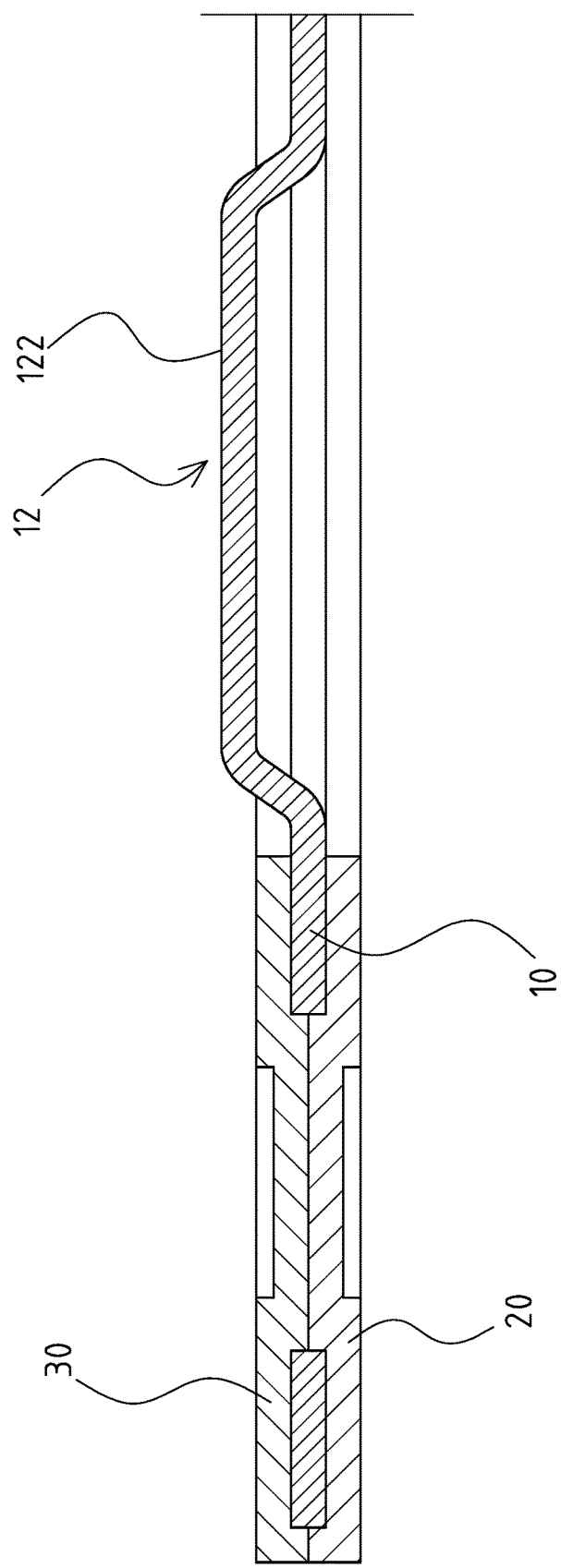
FIG. 4 is a partially cross-sectional view of a first embodiment of the brake disk in accordance with the present invention.
Figure 5:
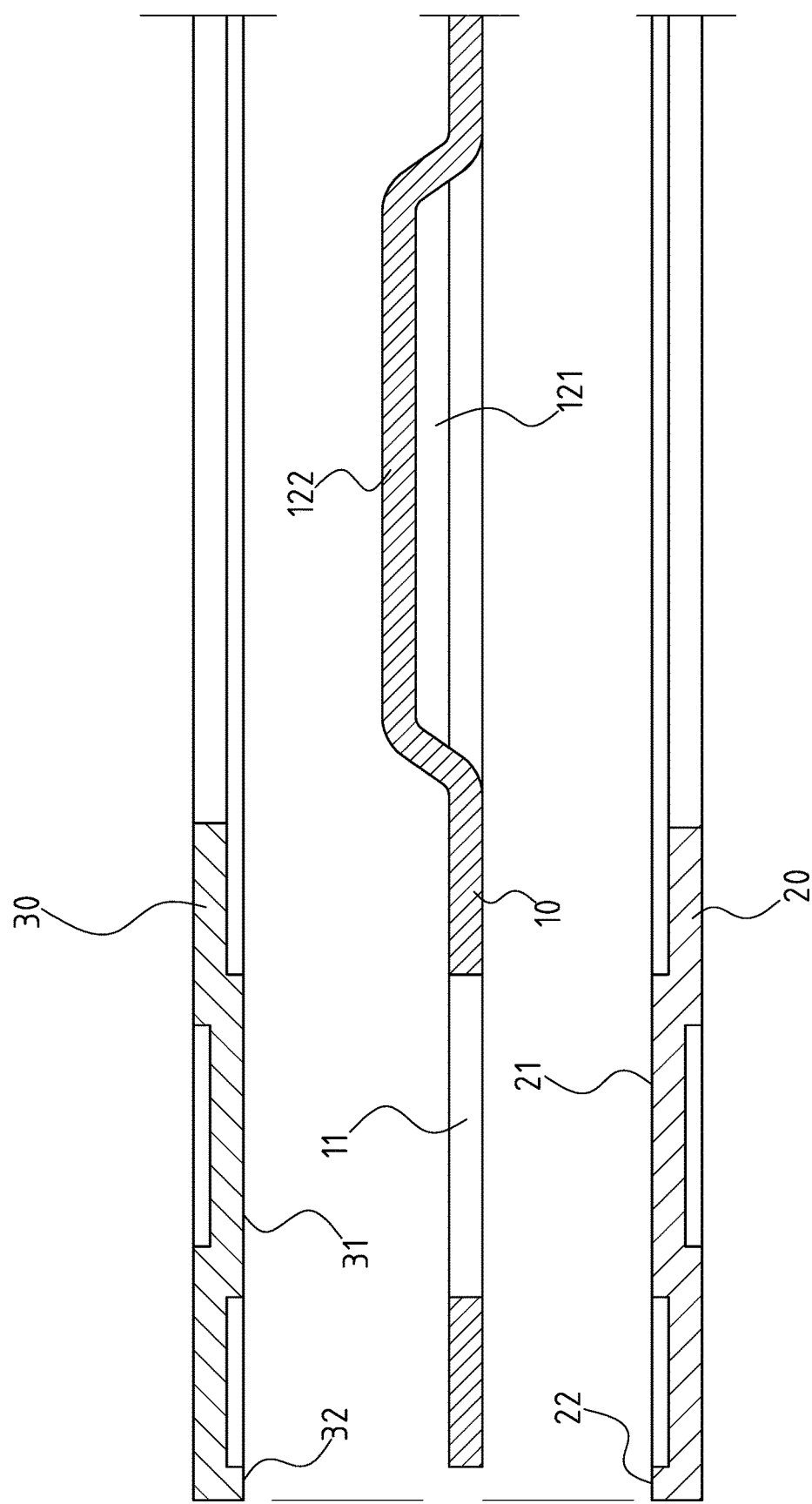
FIG. 5 is a partially exploded cross-section view of a first embodiment of the brake disk in accordance with the present invention.

With reference to FIGS. 4 and 5, the first abrasive disk 20 includes a first annular rib 22 peripherally formed thereon and the second abrasive disk 30 includes a second annular rib 32 peripherally formed thereon, wherein the first annular rib 22 and the second annular rib 32 abut against each other and peripherally surround the heat dissipation disk 10. In the preferred embodiment of the present invention, the first annular rib 22 and the second annular rib 32 securely abut to each other by spot welding.

Figure 2:
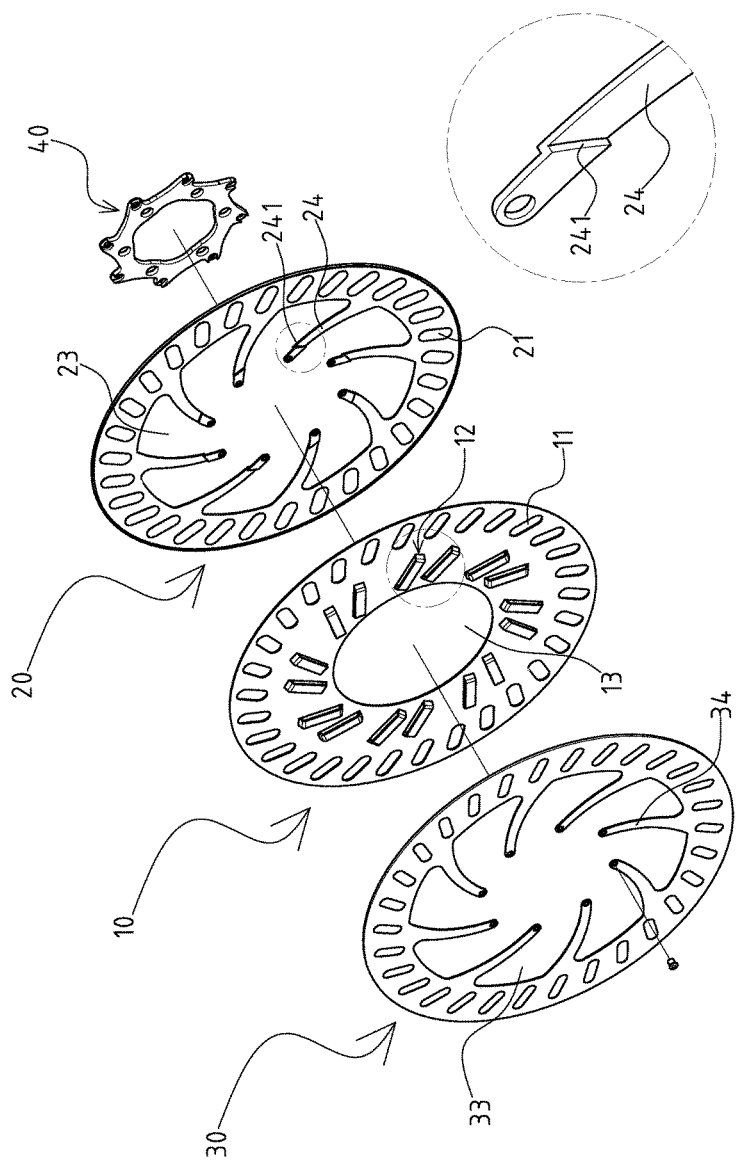
FIG. 2 is an exploded perspective view of the brake disk in FIG. 1.
Figure 3:
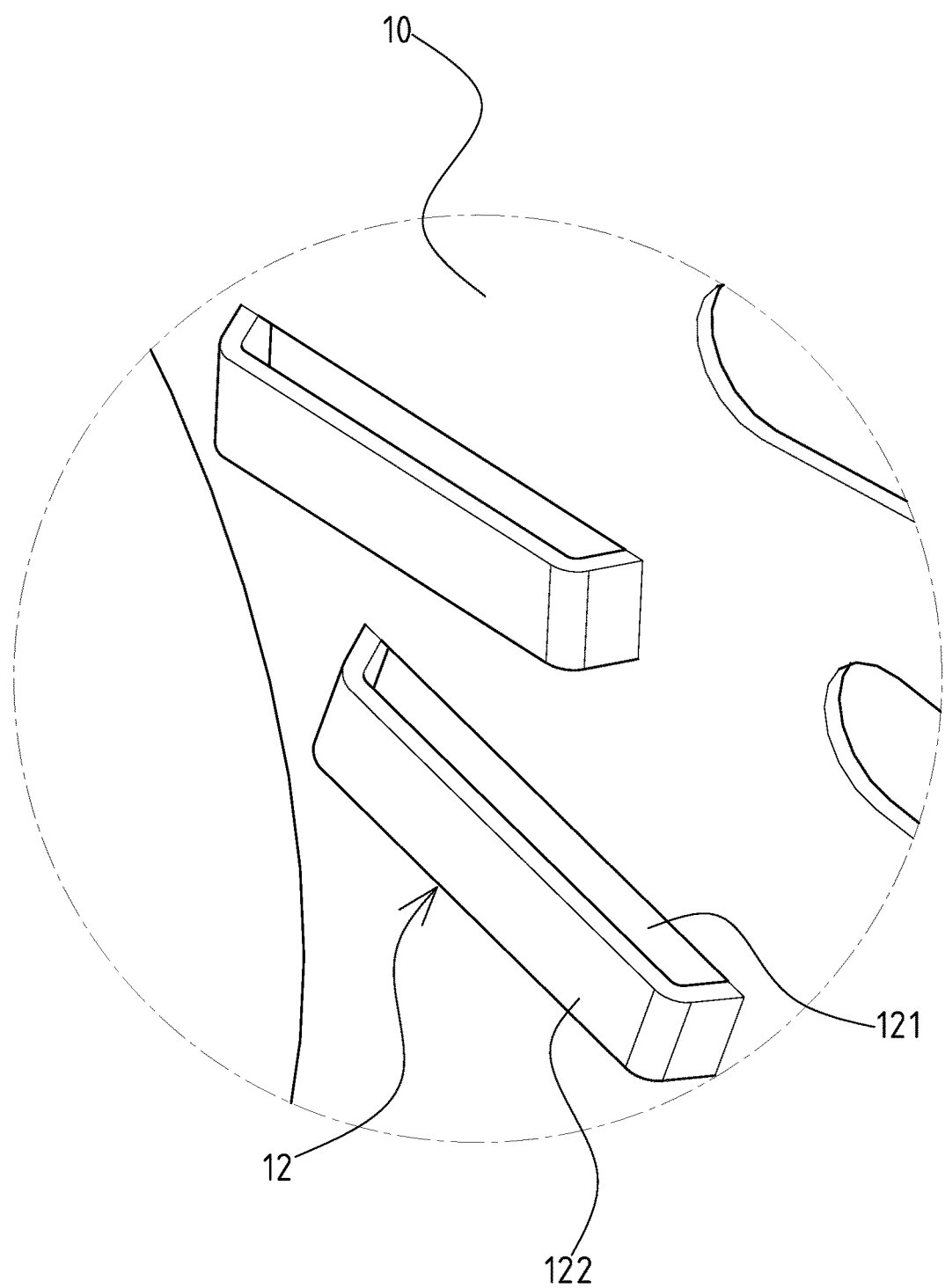
FIG. 3 is a partially enlarged view of the heat dissipation disk in FIG. 2.
Figure 6:
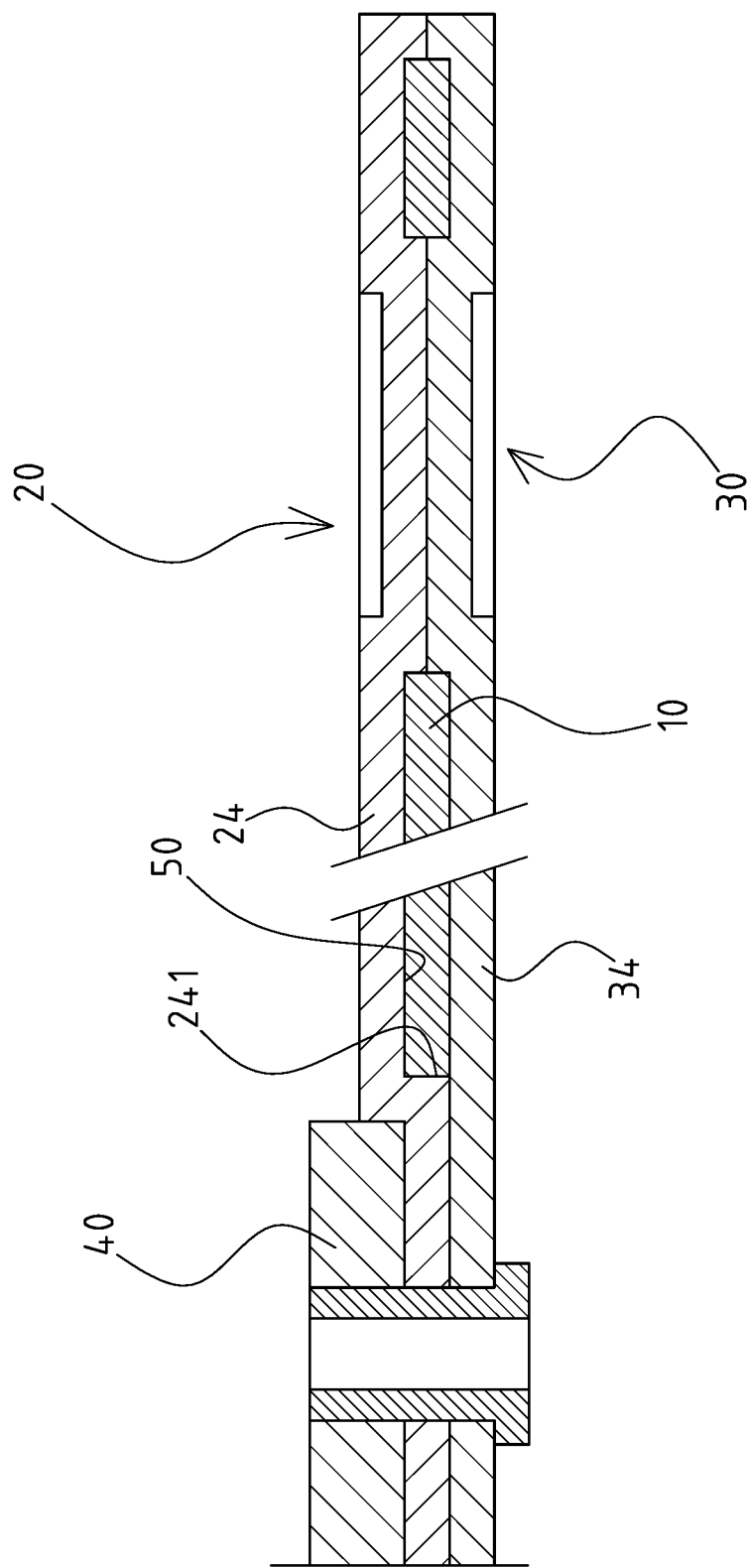
FIG. 6 is another partially cross-sectional view of a first embodiment of the brake disk in accordance with the present invention.

Further with reference to FIGS. 2, 2A and 6, a first opening 23 and a second opening 33 are respectively and centrally defined in the first abrasive disk 20 and the second abrasive disk 30. The first opening 23 and the second opening 33 respectively has a diameter greater than that of the opening 13. The first abrasive disk 20 has multiple first frames 24 inwardly extending from a periphery of the first opening 23 and the second abrasive disk 30 has multiple second frames 34 inwardly extending from a periphery of the second opening 33. Each first frame 24 has a free end abutting a free end of a corresponding one the second frames 34 and the abutted free ends of the first frame 24 and the second end 34 is mounted to a periphery of the middle disk 40. Each first frame 24 has a recess 241 defined in the free end thereof such that a space 50 is defined between the first frame 24 and the second frame 34 for receiving the periphery of the middle disk 40.

Figure 7:
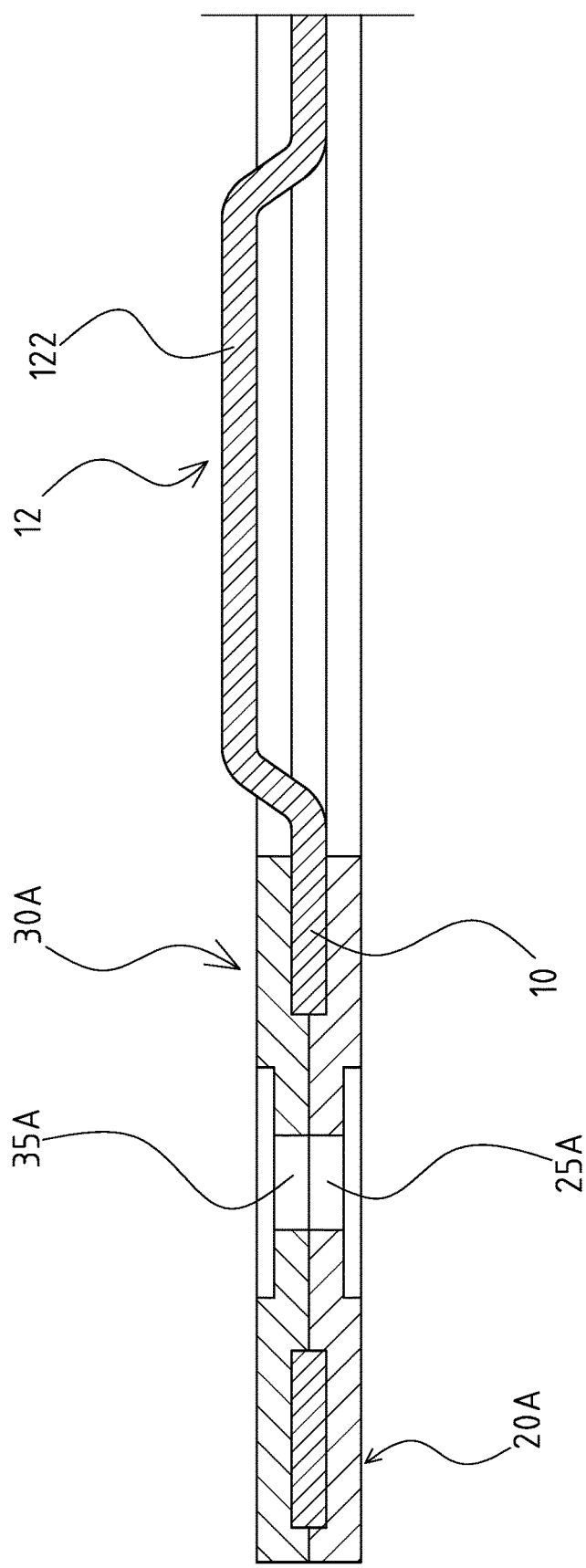
FIG. 7 is a partially cross-sectional view of a second embodiment of the brake disk in accordance with the present invention.
Figure 8:
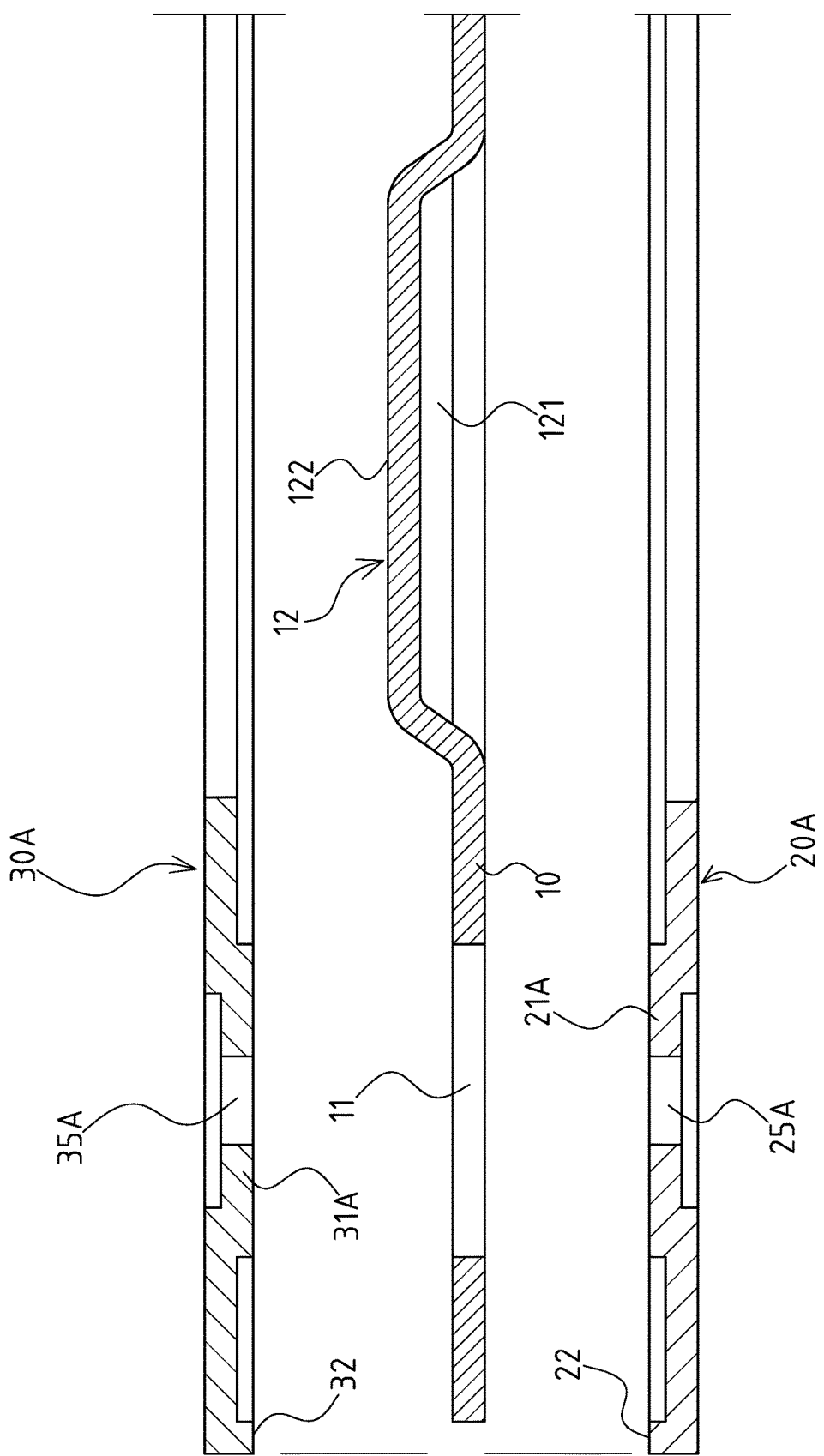
FIG. 8 is a partially exploded cross-section view of the second embodiment of the brake disk in accordance with the present invention.

With reference to FIGS. 7 and 8 that show a second embodiment of the brake disk in accordance with the present invention, in this embodiment, each first raised portion 21A has a first through hole 25A defined therein and each second raised portion 31A has a second through hole 35A defined therein, wherein each first through hole 25A communicates with a corresponding one of the second through holes 35A to define an airway for promoting the heat dissipation effect.

Figure 9:
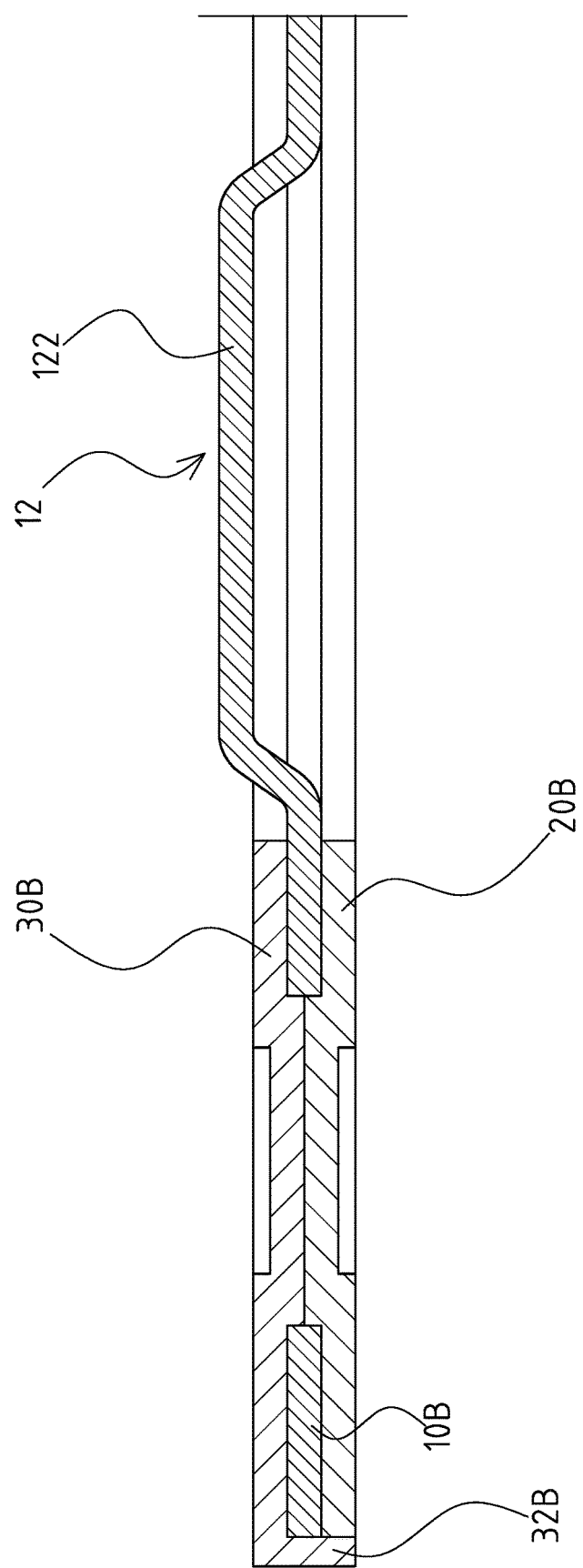
FIG. 9 is a partially cross-sectional view of a third embodiment of the brake disk in accordance with the present invention.
Figure 10:
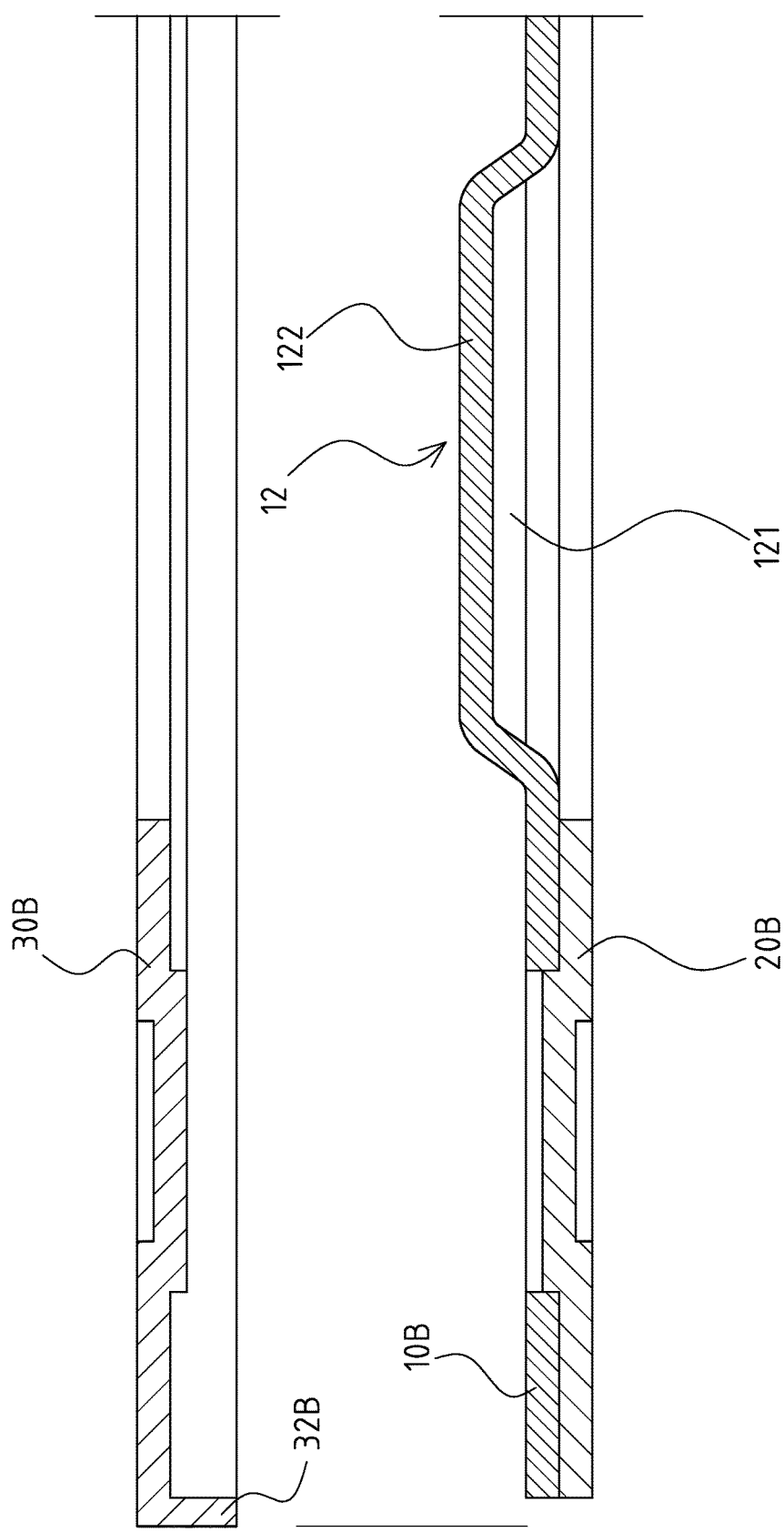
FIG. 10 is a partially exploded cross-section view of the third embodiment of the brake disk in accordance with the present invention.

With reference to FIGS. 9 and 10 that show a third embodiment of the brake disk in accordance with the present invention, in this embodiment, the first abrasive disk 20B has a diameter equal to that of the heat dissipation disk 10B and the second annular rib 32B peripherally surrounds the heat dissipation disk 10B and the first abrasive disk 20B. The second rib 32B is secured to a periphery of the first abrasive disk 20B by spot welding for promoting the connection between the first abrasive disk 20B and the second abrasive disk 30B.

Figure 11:
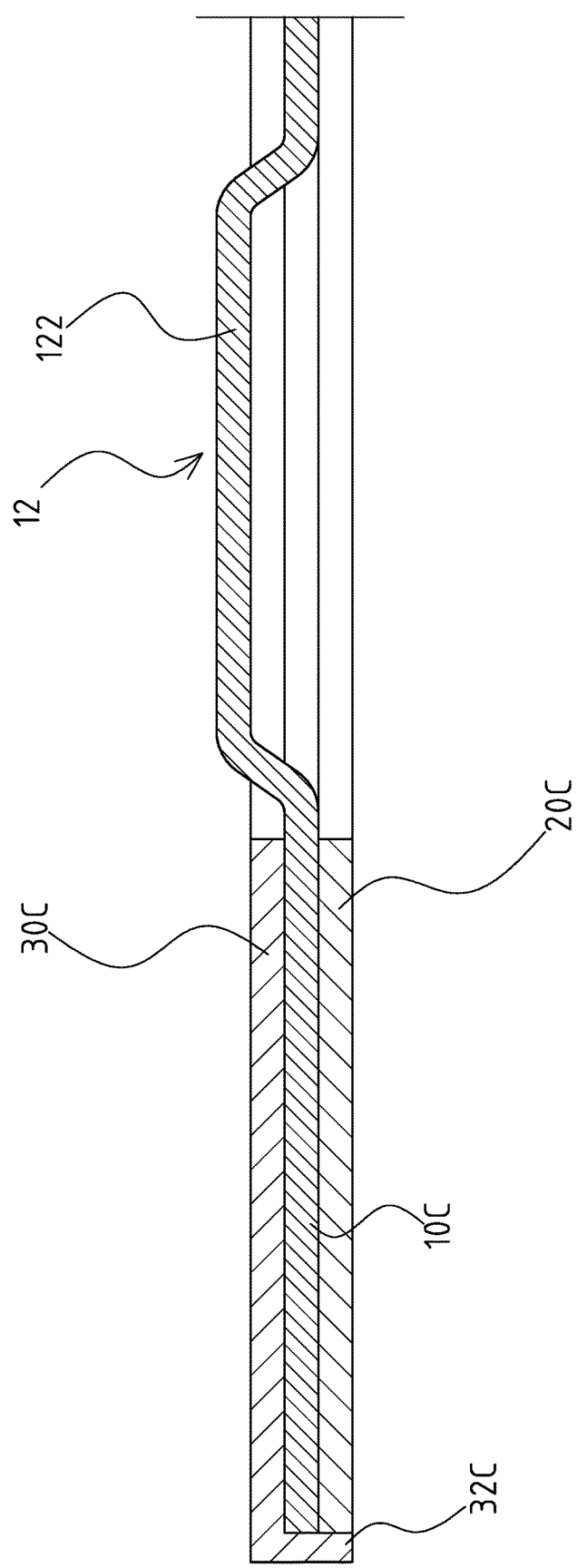
FIG. 11 is a partially cross-sectional view of a fourth embodiment of the brake disk in accordance with the present invention.

With reference to FIG. 11 that shows a fourth embodiment of the brake disk in accordance with the present invention, in this embodiment, the first abrasive disk 20C, the dissipation disk 10C and the second abrasive disk 30C respectively has a flatted outer annular portion. The first abrasive disk 20C has a diameter equal to that of the heat dissipation disk 10C and the second annular rib 32C peripherally surrounds the heat dissipation disk 10C and the first abrasive disk 20C. The second rib 32C is secured to a periphery of the first abrasive disk 20C by spot welding for promoting the connection between the first abrasive disk 20C and the second abrasive disk 30C.

Figure 12:
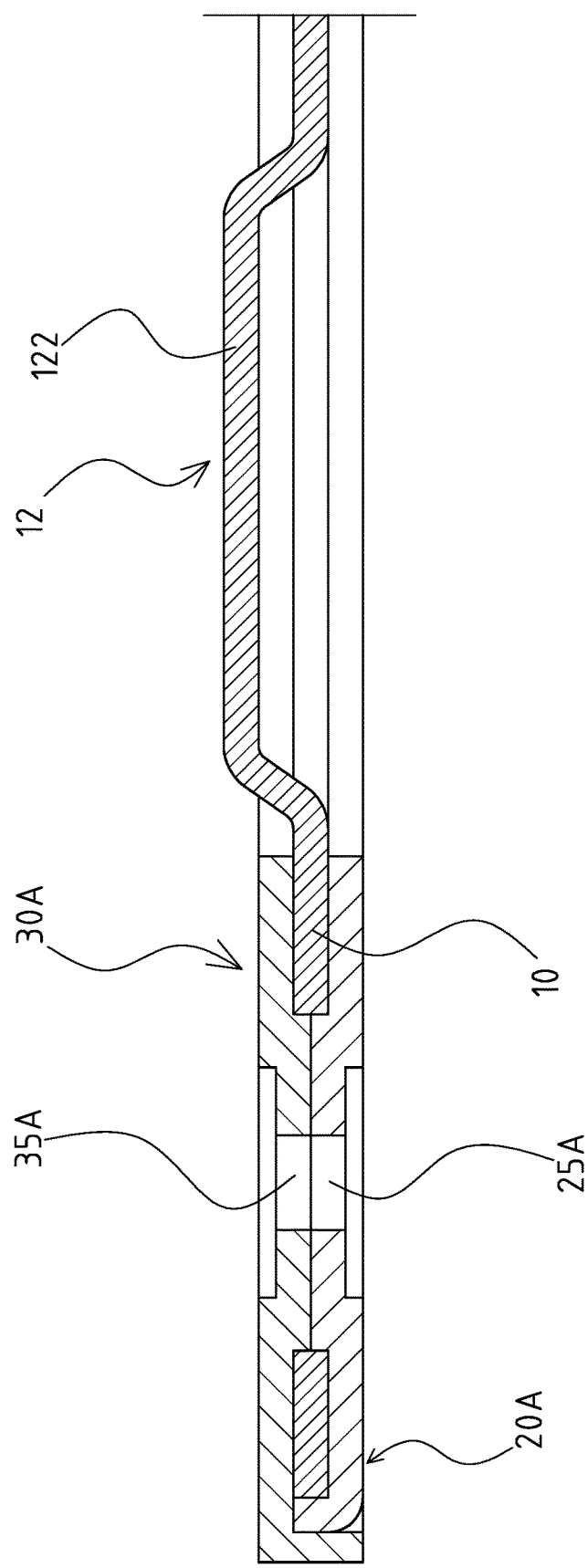
FIG. 12 is a partially cross-sectional view of a fifth embodiment of the brake disk in accordance with the present invention.
Figure 13:
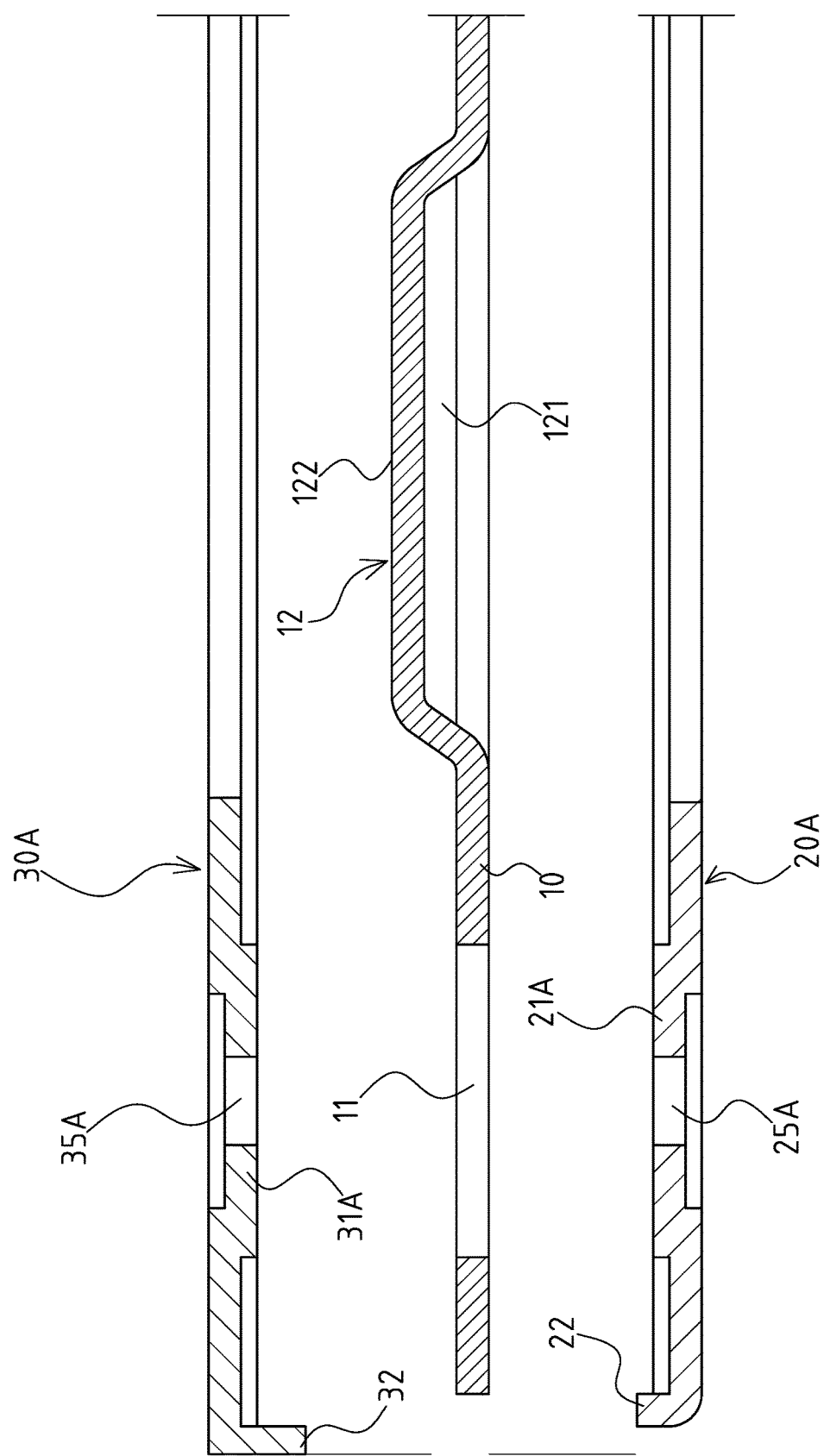
FIG. 13 is a partially exploded cross-section view of the fifth embodiment of the brake disk in accordance with the present invention.

With reference to FIGS. 12 and 13 that show a fifth embodiment of the brake disk in accordance with the present invention, in this embodiment, the first abrasive disk 20D includes a first annular rib 22D peripherally surrounding the heat dissipation disk 10D and the second abrasive disk 30D includes a second annular rib 32D peripherally surrounding the first annular rib 22D, wherein the second annular 32D is secured to the first annular rib 22D by spot welding. The heat dissipation disk 10D includes multiple through holes 11D defined therein and the multiple through holes 11D are annularly arranged. The first abrasive disk 20D has multiple first raised portions 21D formed thereon, wherein each first raised portion 21D is received in a corresponding one of the multiple through holes 11D. The second abrasive disk 30D has multiple second raised portions 31D formed thereon, wherein each second raised portion 31D is received in a corresponding one of the multiple through holes 11D and secured to a corresponding one of the multiple first raised portions 21D. Each first raised portion 21D has a first through hole 25D defined therein and each second raised portion 31D has a second through hole 35D defined therein, wherein each first through hole 25D communicates with a corresponding one of the second through holes 35D to define an airway for promoting the heat dissipation effect.

As described above, the heat dissipation disk 10 is sandwiched between the first abrasive disk 20 and the second abrasive disk 30. Based on cost considerations, the heat dissipation disk 10 is made of aluminum or aluminum alloy, and the first abrasive disk 20 and the second abrasive disk 30 are made of iron for providing the function of high-abrasive. A specific heat capacity coefficient of the heat dissipation disk 10 is greater than that of the first abrasive disk 20 and the second abrasive disk 30 for absorbing thermal energy from the first abrasive disk 20 and the second abrasive disk 30 and lowering the temperature of the first abrasive disk 20 and the second abrasive disk 30 during braking. In addition, the heat dissipation structures 12, including slots 121 and bridges 122, is provided to promote the heat dissipation effect of the heat dissipation disk 10. Furthermore, the first abrasive disk 20 and the second abrasive disk 30 are secured to each other by spot welding such that the connection between the first abrasive disk 20 and the second abrasive disk 30 is strengthened. The heat dissipation disk is made of aluminum or aluminum alloy for providing a functions of lightweight and heat dissipation effect.

Although the invention has been explained in relation to its preferred embodiment, it is to be understood that many other possible modifications and variations can be made without departing from the spirit and scope of the invention as hereinafter claimed.

The invention claimed is:

1. A brake disk comprising:
a first abrasive disk;
a second abrasive disk;
a heat dissipation disk co-axially and securely sandwiched between said first abrasive disk and said second abrasive disk; and
a middle disk co-axially mounted onto said first abrasive disk and said second abrasive disk, wherein said middle disk is adapted to be mounted to a hub, said heat dissipation disk, said first abrasive disk and said second abrasive disk being of a metal material, wherein a specific heat capacity coefficient of said heat dissipation disk is greater than a specific heat capacity of said first abrasive disk and said second abrasive disk for absorbing thermal energy from said first abrasive disk and said second abrasive disk and lowering a temperature of said first abrasive disk and said second abrasive disk during braking; wherein said heat dissipation disk has multiple through holes defined therein, the multiple through holes being annularly arranged, wherein said first abrasive disk has multiple first raised portions formed thereon and a first annular rib peripherally formed thereon, wherein each first raised portion is received in a corresponding one of the multiple through holes, wherein said second abrasive disk has multiple second raised portions formed thereon and a second annular rib peripherally formed thereon, wherein each second raised portion is received in a corresponding one of the multiple through holes and secured to a corresponding one of the multiple first raised portions, wherein the first annular rib and the second annular rib are secured to each other and surround said heat dissipation disk, wherein said heat dissipation disk includes an opening centrally defined therein, a first opening and a second opening are respectively and centrally defined in said first abrasive disk and said second abrasive disk, wherein the first opening and the second opening respectively have a diameter greater than a diameter of the opening, said first abrasive disk has multiple first frames inwardly extending from a periphery of the first opening and the second abrasive disk has multiple second frames inwardly extending from a periphery of the second opening, each first frame has a free end abutting a free end of a corresponding one the second frames and the abutted free ends of the first frame and the second end are mounted to a periphery of the middle disk, each first frame has a recess defined in the free end thereof such that a space is defined between the first frame and the second frame for receiving the periphery of said middle disk.

2. The brake disk of claim 1, wherein the first annular rib and the second annular rib abut each other and respectively and peripherally surround said heat dissipation disk.

3. The brake disk of claim 1, wherein the second annular rib periphery surrounds the first annular rib.

4. The brake disk of claim 1, wherein each first raised portion has a first through hole defined therein and each second raised portion has a second through hole defined therein, each first through hole communicating with a corresponding one of the second through holes to define an airway.

5. The brake disk of claim 4, wherein said heat dissipation disk has multiple heat dissipation structures formed thereon, and the heat dissipation structures including a slot defined in said heat dissipation disk and a bridge having two opposite ends respectively connected to two opposite ends of a corresponding one of the slots.

* * * * *